(12) United States Patent
Fukasawa et al.

(10) Patent No.: US 10,381,649 B2
(45) Date of Patent: Aug. 13, 2019

(54) ELECTRODE MATERIAL FOR NONAQUEOUS ELECTROLYTE BATTERY, ELECTRODE FOR NONAQUEOUS ELECTROLYTE BATTERY, NONAQUEOUS ELECTROLYTE BATTERY INCLUDING THE SAME, AND BATTERY PACK

(71) Applicant: Kabushiki Kaisha Toshiba, Minato-ku (JP)

(72) Inventors: Takayuki Fukasawa, Yokohama (JP); Kenji Essaki, Kawasaki (JP); Takashi Kuboki, Ota (JP); Shinsuke Matsuno, Minato (JP); Tomokazu Morita, Funabashi (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 10 days.

(21) Appl. No.: 15/259,649

(22) Filed: Sep. 8, 2016

(65) Prior Publication Data

US 2017/0271680 A1    Sep. 21, 2017

(30) Foreign Application Priority Data

Mar. 16, 2016 (JP) ................................ 2016-052958

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0471* (2013.01); *H01M 4/131* (2013.01); *H01M 4/134* (2013.01); *H01M 4/366* (2013.01); *H01M 4/386* (2013.01); *H01M 4/483* (2013.01); *H01M 4/587* (2013.01); *H01M 4/622* (2013.01); *H01M 4/625* (2013.01); *H01M 4/661* (2013.01); *H01M 10/052* (2013.01); *H01M 10/425* (2013.01); *H01M 2004/027* (2013.01); *H01M 2300/0037* (2013.01); *Y02T 10/7011* (2013.01)

(58) Field of Classification Search
CPC .... H01M 4/628; H01M 4/0471; H01M 4/366; H01M 4/386; H01M 4/587; H01M 4/622; H01M 4/625; H01M 4/661
See application file for complete search history.

(56) References Cited

U.S. PATENT DOCUMENTS

| | | |
|---|---|---|
| 2003/0113625 A1 | 6/2003 | Kim et al. |
| 2004/0131934 A1 | 7/2004 | Sugnaux et al. |
| 2005/0214644 A1 | 9/2005 | Aramata et al. |
| 2009/0239151 A1 | 9/2009 | Nakanishi et al. |

(Continued)

FOREIGN PATENT DOCUMENTS

| | | |
|---|---|---|
| JP | 2003-197197 A | 7/2003 |
| JP | 2004-533702 A | 11/2004 |

(Continued)

*Primary Examiner* — Helen Oi K Conley
(74) *Attorney, Agent, or Firm* — Oblon, McClelland, Maier & Neustadt, L.L.P.

(57) ABSTRACT

An electrode material for a nonaqueous electrolyte battery that includes a composite particle that contains a silicon dioxide particle having an average primary particle size of D1, a silicon particle having an average primary particle size of D2, and a carbon material, where D1 is 5 nm or more and 80 nm or less and the ratio D2/D1 is 0.3 or more and 8 or less.

9 Claims, 6 Drawing Sheets

(51) Int. Cl.
  *H01M 4/36*    (2006.01)
  *H01M 4/38*    (2006.01)
  *H01M 4/48*    (2010.01)
  *H01M 4/587*   (2010.01)
  *H01M 4/66*    (2006.01)
  *H01M 4/131*   (2010.01)
  *H01M 4/134*   (2010.01)
  *H01M 10/052*  (2010.01)
  *H01M 10/42*   (2006.01)
  *H01M 4/02*    (2006.01)

(56) References Cited

U.S. PATENT DOCUMENTS

2014/0166929 A1  6/2014  Takeuchi et al.
2016/0111711 A1  4/2016  Yoshikawa et al.

FOREIGN PATENT DOCUMENTS

| JP | 2005-310759 A |   | 11/2005 |           |
|----|---------------|---|---------|-----------|
| JP | 2008-282819 A |   | 11/2008 |           |
| JP | 2009-224168 A |   | 10/2009 |           |
| JP | 2010-118330 A |   |  5/2010 |           |
| JP | 2012-14939 A  |   |  1/2012 |           |
| JP | 2013-73920 A  |   |  4/2013 |           |
| JP | 2013-079764   | * |  4/2013 | ........... H01M 4/48 |
| JP | 2015-2036 A   |   |  1/2015 |           |

* cited by examiner

ELECTRODE MATERIAL FOR NONAQUEOUS ELECTROLYTE BATTERY, ELECTRODE FOR NONAQUEOUS ELECTROLYTE BATTERY, NONAQUEOUS ELECTROLYTE BATTERY INCLUDING THE SAME, AND BATTERY PACK

CROSS-REFERENCE TO RELATED APPLICATION

This application is based upon and claims the benefit of priority from Japanese Patent Application No. 2016-52958, filed Mar. 16, 2016, the entire contents of which are incorporated herein by reference.

FIELD

Embodiments described herein relate generally to an electrode material for a nonaqueous electrolyte battery, an electrode for a nonaqueous electrolyte battery, a nonaqueous electrolyte battery including the same, and a battery pack.

BACKGROUND

In recent years, accompanying with the popularization of a lithium ion battery, there is an increasing demand for a battery which is capable of operating at higher voltage and has a higher energy density.

In general, a graphite-based material is used for a negative electrode of a lithium ion battery. The theoretical capacity of a general graphite-based material is 372 mAh/g ($LiC_6$). For this reason, the energy density has substantially reached the limit in a conventional lithium ion battery. In order to further improve the energy density of a lithium ion battery, it is necessary to select a new material. Therefore, the attention is payed to the materials that are alloyed with lithium such as silicon and tin. These materials have a lower potential than carbon and lithium, and have a large specific capacity.

Among these materials, silicon can insert lithium up to 4.4 lithium atoms with respect to 1 silicon atom in a molar ratio. Therefore, silicon can theoretically have 10 times the capacity of a graphite material. However, when a silicon particle inserts lithium atoms, the volume swells by about 3 to 4 times. For this reason, there are the problems that the repetition of charge and discharge cracks and pulverizes silicon particles, and affects the other members constituting the electrodes. In terms of suppressing the pulverization of silicon particles, it is effective to reduce a particle size. However, when reducing a particle size, aggregation is likely to occur. Therefore, the measures such as the coating a silicon particle with a silicon oxide or a carbonaceous material is implemented. However, the decrease in capacity due to repeated use is not sufficiently suppressed even in the aforementioned coated silicon particle.

On the other hand, it is known that a charge and discharge behavior of a lithium atom is shown even in the electrode obtained by using a silicon dioxide as an active material.

Because the volume change of a silicon dioxide is smaller than those of elemental silicon and silicon monoxide, the improvement of cycle life is expected. However, in the electrode in which an electrode active material is made of silicon dioxide alone, the theoretical capacity and efficiency are low, and the energy density is small as compared with the electrode in which an electrode active material is made of silicon (Si) or silicon monoxide (SiO).

Also, there is the known active material containing silicon and the silicon oxide represented by the general formula $SiO_x$ (wherein x is slightly larger than a theoretical value of 1 because of an oxide film). The active material obtained by using a silicon oxide as a starting material forms the structure, in which silicon particles having a size of several nanometers are enclosed in silicon oxides through a disproportionation reaction caused by a thermal treatment. The fine silicon particles are likely to cause aggregation and grain growth in a charge and discharge process, and the improvement of life has not been achieved yet. On the contrary, cycle life is much shortened by introducing silicon. Also, there is the known method of coating silicon dioxide particles with a carbonaceous material followed by firing. In this method, about 60 mass % of a silicon dioxide phase is reduced during the thermal treatment, to thereby produce $SiO_x$ ($0<x\leq1.5$) and the composite particle of the residual silicon dioxide and the carbonaceous material. According to this method, the cycle characteristics are well improved. However, regarding the silicon oxide particle having the composition of $SiO_x$, it is consequently difficult to extend the cycle life for the same reasons as the aforementioned case of a composite material of silicon oxide and silicon.

DETAILED DESCRIPTION

Hereinafter, the embodiments of an electrode material for a nonaqueous electrolyte battery, an electrode for a nonaqueous electrolyte battery, a nonaqueous electrolyte battery including the same, and a battery pack are described with reference to the drawings.

An electrode material for a nonaqueous electrolyte battery of the present embodiment includes a composite particle. The composite particle contains a silicon dioxide particle having an average primary particle size of D1, a silicon particle having an average primary particle size of D2, and a carbon material.

D1 is 5 nm or more and 80 nm or less.

A ratio D2/D1 of D2 to D1 is 0.3 or more and 8 or less.

First Embodiment

The 1st embodiment provides the electrode material for a nonaqueous electrolyte battery includes a composite particle, wherein the composite particle contains a silicon dioxide particle having an average primary particle size of D1, a silicon particle having an average primary particle size of D2, and a carbon material, D1 is 5 nm or more and 80 nm or less, and the ratio D2/D1 of D2 to D1 is 0.3 or more and 8 or less (hereinafter, may be abbreviated as the "electrode material").

Figure 1:
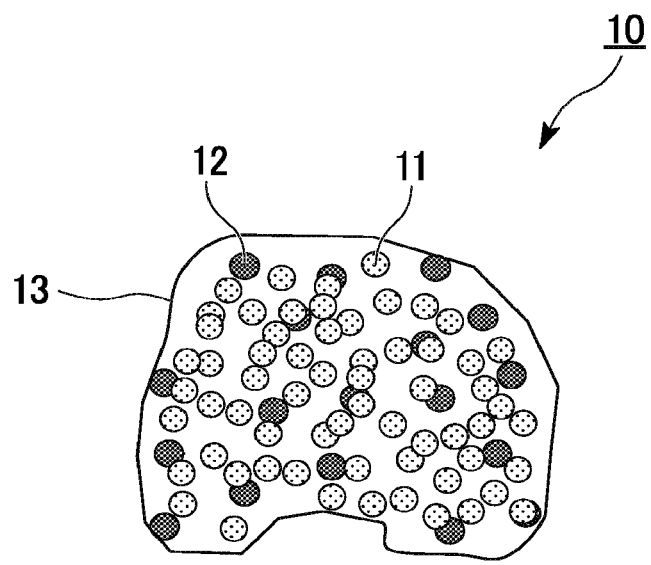
FIG. 1 is a schematic view showing the cross-sectional structure of an example of the electrode material according to the 1st embodiment.

FIG. 1 is a schematic view showing the cross-sectional structure of an example of the electrode material according to the present embodiment.

The composite particle constituting the electrode material of the present embodiment is comprised of the composite structure in which a silicon dioxide particle and a silicon particle capable of inserting and extracting lithium are coated with a carbonaceous material.

The silicon dioxide in the present embodiment means the particle in which the molar ratio (O/Si) of O to Si is within a range of 1.8 or more and 2.2 or less when analyzing the composition of a particle.

The silicon in the present embodiment means the particle in which the molar ratio (O/Si) of O to Si is within a range of 0 or more and 0.2 or less when analyzing the composition of a particle.

The electrode material 10 according to the present embodiment is the composite particle containing the silicon dioxide particles 11, the silicon particles 12, and the carbon material 13 that is complexed with these particles. In other words, as shown in FIG. 1, the electrode material 10 has the structure in which a plurality of the silicon dioxide particles 11 and the silicon particles 12 is coated with the carbon material 13.

It is preferable that the silicon dioxide particle 11 be the particle having no regular crystal structure, i.e. mainly having an amorphous phase. The silicon dioxide particle 11 can partially include a crystalline phase. However, a crystalline phase does not substantially contribute to charge and discharge, and thus, it is preferable that the silicon dioxide particle 11 be the particle mainly having an amorphous phase. Also, it is preferable that a significant peak do not appear on a curve obtained when measuring the silicon dioxide particle 11 by X-ray diffraction (XRD).

It is preferable that the silicon particle 12 be the particle partially having a crystalline phase. Also, it is preferable that the silicon particle 12 have a crystalline phase showing a diffraction peak at 2θ=28.4° in a X-ray diffraction curve.

It is preferable that the carbon material 13 be amorphous. Also, in order to obtain a more effective energy density and cycle characteristics, it is preferable that the content of the silicon dioxide particle 11 and the silicon particle 12 in the electrode material 10 be 40 mass % or more and 80 mass % or less.

When the content of the silicon dioxide particle 11 and the silicon particle 12 is less than 40 mass %, the capacity decreases. On the other hand, when the content of the silicon dioxide particle 11 and the silicon particle 12 is more than 80 mass %, the coating of the silicon dioxide particle 11 and the silicon particle 12 with the carbon material 13 becomes insufficient. As a result, the charge and discharge efficiency in a first-time cycle decreases by film formation in an initial stage of charge, and the cycle performance decreases.

The whole of the silicon dioxide particle 11 and the silicon particle 12 may be coated with the carbon material, and a part thereof may be exposed on the surface of the electrode material 10. The electrode active material 10 can contain an electroconductive auxiliary agent and a void.

When the average primary particle diameter of the silicon dioxide particle 11 is represented by D1 and the average primary particle size of the silicon particle 12 is represented by D2, D1 is 5 nm or more and 80 nm or less, and the ratio D2/D1 of D2 to D1 is 0.3 or more and 8 or less.

Herein, the average primary particle size is the value defined by the following analysis method.

In order to observe the microstructure within the electrode material, a part of the electrode material is subjected to a slicing process, and this part to be observed is further sliced by using an ion milling apparatus, etc. The inside of the composite particle constituting the electrode material is observed by Transmission Electron Microscope (TEM) at a magnification of 200,000 times. Then, at least 10 particles are selected in the diagonal of a field of view, and the longest diameters and the shortest diameters thereof are measured. Then, the measured values are averaged, to thereby obtain the average value. This average value is defined as the average primary particle size.

Regarding the silicon dioxide particle 11, as the average primary particle size D1 thereof is larger, more time is required for the diffusion of lithium during the first-time charge, and the charge time becomes longer. This phenomenon is not preferable because this increases the possibility of the precipitation of lithium, i.e. dendrite formation. It is preferable that D1 be smaller. However, it is difficult to produce the fine silicon dioxide particle 11 having an uniform particle size distribution. Also, as the silicon dioxide particle 11 becomes finer, it becomes more difficult to uniformly disperse the silicon dioxide particles 11 in the composite particle.

Regarding the silicon particle 12, as the average primary particle size D2 thereof is larger, the effect of the volume expansion on the surrounding structure becomes larger. As a result, the cycle characteristics are deteriorated. For this reason, it is preferable that D2 be smaller. However, when D2 is less than 20 nm, the silicon particles 12 are likely to be aggregated. As a result, it becomes difficult to uniformly disperse the silicon particles 12 in the composite particle. In addition, the silicon particles having a too small average primary particle size require attention in terms of safety.

In light of the above description, when D1 is 5 nm or more and 80 nm or less, and the ratio D2/D1 of D2 to D is 0.3 or more and 8 or less, dendrite formation is less likely to occur, and there is a little effect on the cycle life.

It is preferable that the content of the silicon particle 12 in the composite particle be 1 mass % or more and 20 mass % or less.

When the content of the silicon particle 12 is less than 1 mass %, the effect of the silicon particle 12 is not obtained. On the other hand, when the content of the silicon particle 12 is more than 20 mass %, the effect of volume expansion becomes significant, and the composite particle is destroyed by the repetition of charge and discharge. As a result, the cycle life decreases.

Figure 2:
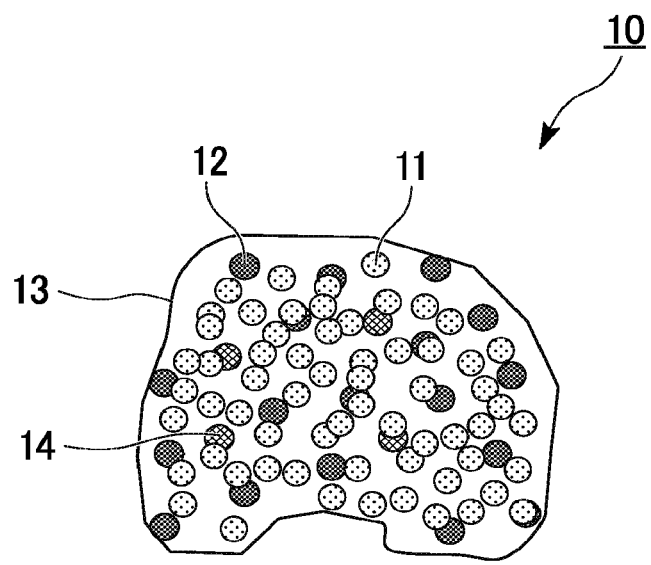
FIG. 2 is a schematic view showing the cross-sectional structure of another example of the electrode material according to the 1st embodiment.

FIG. 2 is a schematic view showing the cross-sectional structure of another example of the electrode material according to the present embodiment.

As shown in FIG. 2, the electrode material 10 according to the present embodiment may have the silicon carbide phase 14.

The silicon carbide phase 14 may be added as a particle, and may be produced by reacting the silicon particle 12 and the carbon material 13 during the thermal treatment in the production of the composite particle. The fine silicon particle 12 reacts with carbon when being subjected to the thermal treatment at 1000° C. or more in an inert atmosphere. Through this reaction, the silicon carbide phase 14 is produced. The presence of the silicon carbide phase 14 can be confirmed by the measurement using a powder X-ray diffraction of the composite particle.

The silicon carbide phase 14 is inactive to lithium in itself, and does not affect the charge characteristics at all. However, when the silicon carbide phase 14 exists, the silicon carbide phase plays a roll of suppressing the aggregation and grain growth of the silicon particles 12 existing around and the silicon phase formed by charge and discharge during the cycle. For this reason, it is possible to improve the cycle life. However, when forming the silicon carbide phase 14 through the reaction of carbon, the originally existing silicon component decreases, and the capacity decreases. Thus, it is not preferable to form the silicon carbide phase 14 in an amount more than necessary by increasing the temperature of the thermal treatment and the like. It is preferable to adjust the temperature of the thermal treatment so as not to exceeding 1200° C. Also, it has been confirmed from the results of experiments that, even when the silicon carbide phase 14 exists, there is no significant effect on initial efficiency, and initial efficiency does not decrease.

Next, the production method of the electrode material for a nonaqueous electrolyte battery according to the embodiment is described.

(Complexing Process)

First, the silicon dioxide particle and the silicon particle are prepared as the raw material powder.

The silicon dioxide particles, the silicon particles and the carbon precursor are mixed, and the resultant mixture is subjected to the thermal treatment, to thereby thermally decompose the carbon precursor. In this manner, the composite particle is produced.

As the carbon precursor to be carbonized by the thermal treatment, it is possible to use a resin-based material or a non-resin-based material.

In order to uniformly mix the silicon dioxide particles and the silicon particles, the carbon precursor is preferably soluble in a liquid or a dispersion medium in the mixing stage, and is particularly preferably a liquid and a readily polymerizable monomer or oligomer.

Examples of a resin-based material include a furan resin, a xylene resin, a ketone resin, an amino resin, a melamine resin, a urea resin, an aniline resin, a urethane resin, a polyimide resin, a polyester resin, a phenolic resin, a resole resin, a novolac resin and a polyvinyl alcohol.

Examples of the non-resin-based material include sucrose and ascorbic acid.

When mixing the silicon dioxide particles, the silicon particles and the carbon precursor, particles that act as the electroconductive auxiliary agent can be added to improve conductivity.

As the conductive auxiliary agent, it is possible to preferably use a carbon material such as highly crystalline graphite, a carbon nanofiber or a carbon nanotube; or a microparticle such as acetylene black. Graphite is preferable in terms of improving the conductivity and capacity of the electrode material.

It is preferable that the complexing of the silicon dioxide particles, the silicon particles and the carbon precursor be carried out by mixing those in a dispersion medium in a liquid phase in order to dispersing these materials more uniformly.

As the dispersion medium, an organic solvent or water, etc. can be used, and it is preferable to use a liquid having a good affinity for the silicon dioxide particle, the silicon particle and the carbon precursor. Examples of the dispersion medium include ethanol, acetone, isopropyl alcohol, methyl ethyl ketone, ethyl acetate and N-methyl-2-pyrrolidone (NMP). A silicon dioxide particle is generally hydrophilic, and depending on a solvent, the surface of a silicon dioxide particle is subjected to a hydrophobic treatment, to thereby effectively improve the dispersibility.

The mixing and stirring treatment for the silicon dioxide particles, the silicon particles and the carbon precursor can be carried out by using various types of stirring device, a ball mill, and a bead mill. The mixing and stirring treatment can be carried out by using 1 type alone or the combination of 2 types or more of the aforementioned devices.

The mixing and stirring treatment is not limited to the aforementioned mixing in a liquid, and for example, the mixture can be produced by kneading or extrusion molding using a small amount of solvent.

After mixing, the mixture is dried to remove the solvent.

As the drying method, for example, it is possible to use a method for drying the mixture under reduced pressure while homogenizing the mixture using an evaporator, etc. Alternatively, it is possible to use a method such as spray drying.

After drying, the material that requires a curing treatment for polymerization is put and heated in an electric furnace, to thereby carry out a curing treatment. The conditions for a curing treatment are appropriately adjusted depending on the type of the carbon precursor, and it is preferable to carry out the heating at 120° C. or more and 200° C. or less for at least 1 hour.

(Carbonization and Firing Treatment)

For example, the carbonization and firing of the aforementioned composite particle is carried out under an inert atmosphere such as argon (Ar). The atmosphere during the carbonization and firing of the composite particles is not limited to an inert atmosphere, but can be a nitrogen atmosphere or a mixed atmosphere of argon containing hydrogen.

The temperature during the carbonization and firing of the aforementioned composite particle is appropriately adjusted depending on the thermal decomposition temperature of the carbon precursor contained in the composite particle, and it is preferable that the temperature be 900° C. or more and 1200° C. or less. In the process of the thermal treatment, it is possible to simultaneously form the silicon carbide phase. The silicon particle and the carbon precursor are reacted at a temperature of more than 1000° C., which produces the silicon carbide phase.

It is not preferable that the temperature of carbonization and firing exceed 1200° C. because the carbonization and silicidation of the silicon particle and the carbon precursor proceed more than necessary, and the discharge capacity significantly decreases. The more preferable range of the temperature of the thermal treatment is 1000° C. or more and 1100° C. or less.

The firing time is preferably 10 minutes or more and 12 hours or less.

The silicon carbide phase can be confirmed by performing X-ray diffraction measurement of the produced composite particle.

Through the synthesis method described above, it is possible to obtain the electrode material according to the present embodiment.

Regarding the product (electrode material) of the carbonization and firing, the particle size and specific surface area, etc. may be appropriately adjusted to predetermined ranges by using various mills, a pulverizing device and a grinder, etc.

The electrode material according to the 1st embodiment includes the composite particle. This composite particle contains the silicon dioxide particle having an average primary particle size of D1, the silicon particle having an average primary particle size of D2, and the carbon material. Also, D1 is 5 nm or more and 80 nm or less, and the ratio D2/D1 of D2 to D1 is 0.3 or more and 8 or less. Also, the electrode material according to the 1st embodiment has the diffraction peak at least at 2θ=28.40 in a powder X-ray diffraction measurement. The peak at 2θ=28.40 is attributed to the silicon particle. By using this type of electrode material, it is possible to increase the first-time charge and discharge efficiency and the cycle life, and consequently, it is possible to achieve the nonaqueous electrolyte battery excellent in energy density and long life.

Second Embodiment

The 2nd embodiment provides the electrode for a nonaqueous electrolyte battery including a current collector; and the electrode mixture layer that is formed on the current collector and contains the aforementioned electrode material for a nonaqueous electrolyte battery according to the 1st embodiment, an electroconductive agent and a binder (hereinafter, may be abbreviated as the "electrode").

Figure 3:
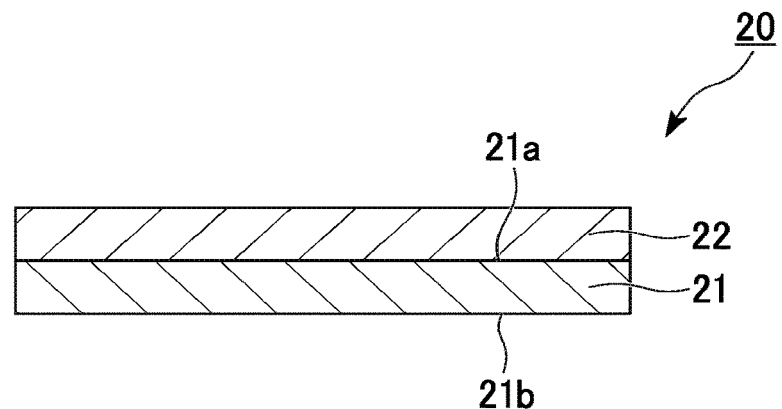
FIG. 3 is a cross-sectional view showing the schematic configuration of the electrode for a nonaqueous electrolyte battery according to the 2nd embodiment.

FIG. 3 is a cross-sectional view showing the schematic configuration of the electrode for a nonaqueous electrolyte battery according to the present embodiment. The electrode 20 according to the present embodiment includes the sheet-shaped current collector 21; and the electrode mixture layer (the electrode active material layer) 22 as shown in FIG. 3. This electrode 20 is used as, for example, the negative electrode for a nonaqueous electrolyte battery described below.

The electrode mixture layer 22 is the layer which is formed on at least one surface 21a of the current collector 21 and contains the electrode material for a nonaqueous electrolyte battery according to the 1 st embodiment, the electroconductive agent and the binder. In other words, the electrode mixture layer 22 is the layer in which the electrode material according to the 1st embodiment is formed on at least one surface 21a of the current collector 21.

The binder fills the gap between the electrode materials constituting the electrode mixture layer 22 so as to bind the electrode materials with each other or the electrode material with the electroconductive agent and to bond the current collector 21 and the electrode mixture layer 22. The electroconductive agent and the binder are optional components. Herein, the electrode mixture layer 22 may also be formed on the other surface 21b of the current collector 21.

The current collector 21 is the electroconductive member to be bound with the electrode mixture layer 22. As the current collector 21, it is possible to use an electroconductive substrate having a porous structure or a non-porous electroconductive substrate. These electroconductive substrates can be formed of an electroconductive material such as copper, nickel, an alloy thereof or stainless steel. Of these electroconductive materials, copper (including a copper alloy) and stainless steel are the most preferable in terms of electroconductivity.

Also, it is preferable that the thickness of the current collector 21 be 5 μm or more and 20 μm or less. When the thickness of the current collector 21 is within the aforementioned range, it is possible to achieve the balance between electrode strength and reduction in weight.

The thickness of the electrode mixture layer 22 on one surface is preferably 1.0 μm or more and 150 μm or less, and more preferably 10 μm or more and 100 μm or less. Therefore, when the electrode mixture layer 22 is provided on one surface 21a and the other surface 21b of the current collector 21, the total thickness of the electrode mixture layers 22 is preferably 2.0 μm or more and 300 μm or less, and more preferably 20 μm or more and 200 μm or less. By adjusting the thickness of the electrode mixture layer 22 to 1.0 μm or more and 150 μm or less, the large current discharge characteristics and cycle life of the nonaqueous electrolyte battery are significantly improved.

As the binder, it is possible to use at least one selected from the group consisting of polyamic acid, polyamide-imide, polyimide, polyaramide, polyacrylic acid, polyvinylidene fluoride (PVdF), styrene-butadiene rubber (SBR) and carboxymethyl cellulose. It is possible to use 1 type alone or the combination of 2 types or more of the binder.

The electrode 20 excellent in life property can be obtained by using the combination of the binder having excellent binding property between the electrode materials and the binder having excellent binding property between the electrode material and the current collector 21, or the combination of the binder having high hardness and the binder having excellent flexibility.

In the present embodiment, the interfacial binding strength between the current collector 21 and the electrode mixture layer 22 is important, and polyamide-imide and polyimide are more preferable as the binder because it is possible to bind the current collector and the electrode mixture layer with a higher binding strength.

Examples of the electroconductive agent include acetylene black, carbon black and graphite.

Next, the production method of the electrode 20 is described.

(Formation of Electrode Mixture Layer)

The aforementioned electrode 20 is produced by using the electrode material produced by the aforementioned method.

Firstly, the electrode material and the binder are suspended in a general solvent so as to prepare a slurry. Herein, the electroconductive agent is added thereto as necessary so as to prepare a slurry.

Subsequently, the slurry is applied onto at least one surface 21a of the current collector 21 followed by drying to form the active material-containing coating film. Thereafter, the coating film on the current collector 21 is rolled to thereby form the electrode mixture layer 22.

Also, the mixture containing the electrode material, the electroconductive agent and the binder is molded in a pellet shape, and this pellet-shaped mixture is placed on at least one surface 21a of the current collector 21. Through this process, it is possible to form the electrode mixture layer 22.

As described above, it is possible to obtain the electrode 20 according to the present embodiment.

According to the electrode 20 for a nonaqueous electrolyte battery of the present embodiment, the electrode mixture layer 22 includes the electrode material according to the 1st embodiment, and therefore, it is possible to improve the first-time charge and discharge efficiency and cycle life, and to achieve the nonaqueous electrolyte battery excellent in energy density and long life.

Third Embodiment

The 3rd embodiment provides the nonaqueous electrolyte battery including the negative electrode comprised of the electrode according to the 2nd embodiment, a positive electrode, a nonaqueous electrolyte, a separator and an exterior material. More specifically, the nonaqueous electrolyte battery according to the present embodiment includes an exterior material, a positive electrode that is housed in the exterior material, the negative electrode that is spatially separated from the positive electrode and is housed in the exterior material with a separator interposed therebetween, and a nonaqueous electrolyte charged in the exterior material.

Hereinafter, the negative electrode, the positive electrode, the nonaqueous electrolyte, the separator and the exterior material, which are constituent members of the nonaqueous electrolyte battery according to the present embodiment, are described in detail.

(1) Negative Electrode

As the negative electrode, the electrode according to the 2nd embodiment is used.

(2) Positive Electrode

The positive electrode includes the positive electrode current collector and the positive electrode mixture layer that is formed on one surface or both surfaces of the positive electrode current collector and contains a positive electrode active material, an electroconductive agent and a binder. An electroconductive agent and a hinder are optional components.

As the positive electrode active material, various oxides can be used, and examples of oxides include manganese dioxide, a lithium-manganese composite oxide, a lithium-containing cobalt oxide (such as $LiCoO_2$), a lithium-containing nickel-cobalt oxide (such as $LiNi_{0.8}Co_{0.2}O_2$) and a lithium-manganese composite oxide (such as $LiMn_2O_4$ or $LiMnO_2$). As the positive electrode active material, these compounds can be used alone or in combination of two or more. It is preferable to use these positive electrode active materials because the nonaqueous electrolyte battery can have a high voltage.

The electroconductive agent improves the current collection performance of the positive electrode active material and suppresses contact resistance between the positive electrode active material and the positive current collector.

Examples of the electroconductive agent include agents containing acetylene black, carbon black, artificial graphite, natural graphite, a carbon fiber, and an electroconductive polymer.

It is possible to use 1 type alone or the combination of 2 types or more of the electroconductive agent.

The binder fills the gap between the dispersed positive electrode active materials so as to bind the positive electrode active material and the electroconductive agent and to bind the positive electrode active material and the positive electrode current collector. Examples of the binder include polytetrafluoroethylene (PTFE), polyvinylidene fluoride (PVdF), fluorine-based rubber, styrene-butadiene rubber (SBR), polypropylene (PP), polyethylene (PE), carboxymethyl cellulose (CMC), polyimide (PI), and polyacrylimide (PAI).

It is possible to use 1 type alone or the combination of 2 types or more of the binder.

Also, examples of an organic solvent for dispersing the binder include N-methyl-2-pyrrolidone (NMP) and dimethylformamide (DMF).

Regarding the blending ratio of the positive electrode active material, the electroconductive agent and the binder in the positive electrode mixture layer, the positive electrode active material is preferably blended within a range of 80 mass % to 95 mass %, the electroconductive agent is preferably blended within a range of 3 mass % to 20 mass %, and the binder is preferably blended within a range of 2 mass % to 7 mass %.

The positive electrode current collector is the electroconductive member to be bound with the positive electrode mixture layer. As the positive electrode current collector, an electroconductive substrate having a porous structure or a non-porous electroconductive substrate can be used.

The thickness of the positive electrode current collector is preferably within a range of 5 µm to 20 µm. When the thickness of the positive electrode current collector is within the range, it is possible to achieve the balance between electrode strength and reduction in weight.

Next, the production method of the positive electrode is described.

Firstly, the positive electrode active material, the electroconductive agent and the binder are suspended in a general solvent so as to prepare slurry.

Subsequently, the slurry is applied on the positive electrode current collector followed by drying to form the positive electrode mixture layer. Then, the positive electrode mixture layer is subjected to pressing, to thereby obtain the positive electrode. Also, the positive electrode can be produced by molding the positive electrode active material, the binder and the electroconductive agent to be blended according to need in a pellet shape to form the positive electrode mixture layer, and disposing this positive electrode mixture layer on the positive electrode current collector.

(3) Nonaqueous Electrolyte

As the nonaqueous electrolyte, a nonaqueous electrolyte solution, an electrolyte-impregnated polymer electrolyte, a polymer electrolyte or an inorganic solid electrolyte are used.

A nonaqueous electrolyte solution is a liquid nonaqueous electrolyte prepared by dissolving an electrolyte in a nonaqueous solvent (an organic solvent), and is held in the gap in the electrode group.

As a nonaqueous solvent, it is preferable to use the nonaqueous solvent which mainly contains the mixed solvent of cyclic carbonates (hereinafter, referred to as the "1st solvent") such as ethylene carbonate (EC), propylene carbonate (PC) and vinylene carbonate, and nonaqueous solvents having lower viscosity than the cyclic carbonates (hereinafter, referred to as the "2nd solvent").

Examples of the 2nd solvent include chain carbonates such as dimethyl carbonate (DMC), diethyl carbonate (DEC) and methylethyl carbonate (MEC), cyclic ethers such as tetrahydrofuran and 2-methyltetrahydrofuran; chain ethers such as dimethoxyethane and diethoxyethane; ethyl propionate; methyl propionate; γ-butyrolactone (GBL); acetonitrile (AN); ethyl acetate (EA); toluene; xylene; and methyl acetate (MA). It is preferable that the 2nd solvent have a donor number of 16.5 or less. It is preferable that the viscosity of the 2nd solvent be 2.8 cP or less at 25° C. Herein, 1 cP is converted into 1 mPa·s.

It is preferable that the blending amount of ethylene carbonate or propylene carbonate in the mixed solvent be 1.0 vol % to 80 vol %. More preferable blending amount of ethylene carbonate or propylene carbonate is 20 vol % to 75 vol %.

Examples of an electrolyte contained in a nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), and lithium trifluoromethanesulfonate ($LiCF_3SO_3$). Among these, it is preferable to use lithium hexafluorophosphate or lithium tetrafluoroborate.

It is preferable that the dissolving amount of the electrolyte relative to the nonaqueous solvent contained in nonaqueous electrolyte be 0.5 mol/L or more and 2.0 mol/L or less.

(4) Separator

The separator is placed between the positive electrode and the negative electrode in order to prevent the positive electrode and the negative electrode from having contact with each other. The separator is comprised of an insulating material.

The shape, by which an electrolyte can move between the positive electrode and the negative electrode, is used for the separator. The separator is formed of a porous film containing polyethylene (PE), polypropylene (PP), cellulose or polyvinylidene fluoride (PVdF), or a nonwoven fabric made of a synthetic resin, for example. Among these, a porous film formed of at least one of polyethylene and polypropylene is preferable because it is possible to improve the safety of a secondary battery.

It is preferable that the thickness of the separator be 5 μm or more and 30 μm or less. When the thickness of the separator is less than 5 μm, the strength of the separator is significantly deteriorated, and the internal short circuit is likely to occur. Meanwhile, when the thickness of the separator is more than 30 μm, the distance between the positive and negative electrodes is increased, and the internal resistance may be increased.

When the separator is allowed to stand for 1 hour at 120° C., the thermal shrinkage percentage is preferably 20% or less and more preferably 15% or less. When the thermal shrinkage percentage of the separator is more than 20%, the possibility that the short circuit is caused by heating is increased.

The porosity of the separator is preferably 30 vol % to 70 vol % and more preferably 35 vol % to 70 vol %.

The surface of the separator can be coated with ceramic particles. Through this coating, it is possible to improve the safety of the separator. Examples of ceramic particles include $Al_2O_3$, $TiO_2$ and $ZrO_2$.

(5) Exterior Material

As the exterior material which houses the positive electrode, the negative electrode and the nonaqueous electrolyte, it is possible to use a metal container or an exterior container made of a laminated film.

As a metal container, it is possible to use the metal can formed of aluminum, an aluminum alloy, iron or stainless steel in a rectangular or cylindrical shape.

As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte battery which has high power and excellent heat radiation property.

Examples of a laminated film include a multi-layer film in which an aluminum foil is coated with a resin film. As a resin constituting a resin film, it is possible to use a polymer compound such as polypropylene (PP), polyethylene (PE), nylon or polyethylene terephthalate (PET).

Herein, the present embodiment can be applied to the nonaqueous electrolyte battery having various shapes such as a flat type (thin type), a square type, a cylindrical type, a coin type and a button type.

Also, the nonaqueous electrolyte battery according to the present embodiment can further include a lead which is electrically connected to the electrode group containing the positive electrode and the negative electrode. For example, the nonaqueous electrolyte battery according to the present embodiment can include two leads. In this case, one of the leads is electrically connected to the positive electrode current collector tab and the other lead is electrically connected to the negative electrode current collector tab.

The material of the lead is not particularly limited, but for example, it is possible to use the same material for the positive electrode current collector and the negative electrode current collector.

The nonaqueous electrolyte battery according to the present embodiment can further include a terminal which is electrically connected to the aforementioned lead and is drawn from the aforementioned exterior material. For example, the nonaqueous electrolyte battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

(6) Nonaqueous Electrolyte Battery

Figure 4:
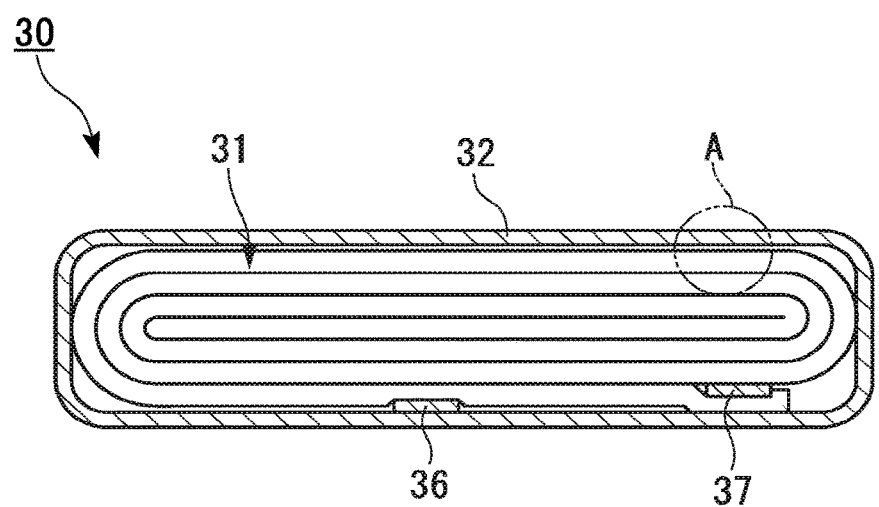
FIG. 4 is a schematic view showing the nonaqueous electrolyte battery according to the 3rd embodiment.
Figure 5:
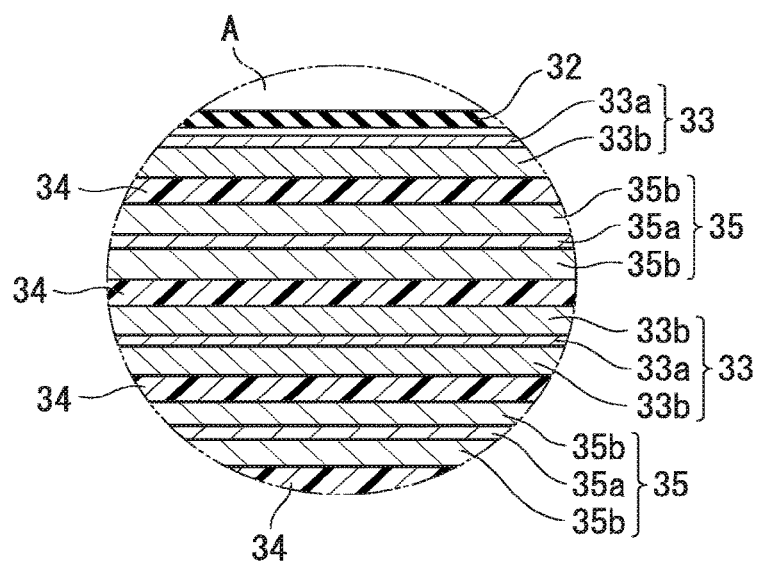
FIG. 5 is a schematic view showing the nonaqueous electrolyte battery according to the 3rd embodiment.

Next, the flat type nonaqueous electrolyte battery (nonaqueous electrolyte battery) 30 shown in FIG. 4 and FIG. 5 is described as an example of the nonaqueous electrolyte battery according to the present embodiment. FIG. 4 is a schematic cross-sectional view showing the flat type nonaqueous electrolyte battery 30. FIG. 5 is an enlarged cross-sectional view showing the part A shown in FIG. 4. These drawings are schematic diagrams for describing the nonaqueous electrolyte battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte battery 30 shown in FIG. 4 is configured such that the winding electrode group 31 with a flat shape is housed in the exterior material 32. The exterior material 32 may be a container obtained by forming a laminated film in a bag-like shape or may be a metal container. Also, the winding electrode group 31 with the flat shape is formed by spirally winding the laminated product obtained by laminating the negative electrode 33, the separator 34, the positive electrode 35 and the separator 34 from the outside, i.e. the side of the exterior material 32, in this order, followed by performing press-molding. As shown in FIG. 5, the negative electrode 33 located at the outermost periphery has the configuration in which the negative electrode layer 33b is formed on one surface of the negative electrode current collector 33a on the inner surface side. The negative electrodes 33 at the parts other than the outermost periphery have the configuration in which the negative electrode layers 33b are formed on both surfaces of the negative current collector 33a. Also, the positive electrode 35 has the configuration in which the positive electrode layers 35b are formed on both surfaces of the positive current collector 35a. Herein, a gel-like nonaqueous electrolyte can be used instead of the separator 34.

In the vicinity of the outer peripheral end of the winding electrode group 31 shown in FIG. 4, the negative electrode terminal 36 is electrically connected to the negative current collector 33a of the negative electrode 33 of the outermost periphery. The positive electrode terminal 37 is electrically connected to the positive current collector 35a of the inner positive electrode 35. The negative electrode terminal 36 and the positive electrode terminal 37 extend toward the outer portion of the exterior material 32, and are connected to the extraction electrodes included in the exterior material 32.

When manufacturing the nonaqueous electrolyte battery 30 including the exterior material formed of the laminated film, the winding electrode group 31 to which the negative electrode terminal 36 and the positive electrode terminal 37 are connected is charged in the exterior material 32 having the bag-like shape with an opening. Subsequently, the liquid nonaqueous electrolyte is injected from the opening of the exterior material 32. Then, the opening of the exterior material 32 with the bag-like shape is subjected to heat-sealing in the state of sandwiching the negative electrode terminal 36 and the positive electrode terminal 37 therebetween, to thereby completely seal the winding electrode group 31 and the liquid nonaqueous electrolyte.

Also, when manufacturing the nonaqueous electrolyte battery 30 having the exterior material formed of the metal container, the winding electrode group 31 to which the negative electrode terminal 36 and the positive electrode terminal 37 are connected is charged in the metal container having an opening. Subsequently, the liquid nonaqueous electrolyte is injected from the opening of the exterior material 32. Then, the opening is sealed by mounting a cover member on the metal container.

For the negative electrode terminal 36, it is possible to use, for example, the material having electric stability and electroconductivity when a potential with respect to lithium is within a range of 0 V or more and 3 V or less. Specific examples of this material include aluminum and an aluminum alloy containing an element such as Mg, Ti, Zn, Mn, Fe, Cu or Si. Also, it is more preferable that the negative electrode terminal 36 be formed of the same material as the negative current collector 33a in order to reduce the contact resistance with the negative current collector 33a.

For the positive electrode terminal 37, it is possible to use the material having electric stability and electroconductivity when a potential with respect to lithium is within a range of 2 V or more and 4.25 V or less. Specific examples of this material include aluminum and an aluminum alloy containing an element such as Mg, Ti, Zn, Mn, Fe, Cu or Si. It is more preferable that the positive electrode terminal 37 be formed of the same material as the positive current collector 35a in order to reduce the contact resistance with the positive current collector 35a.

Hereinafter, the exterior material 32, the negative electrode 33, the positive electrode 35, the separator 34, and the nonaqueous electrolyte which are constituent members of the nonaqueous electrolyte battery 30 is described in detail.

(1) Exterior Material

As the exterior material 32, the aforementioned exterior material is used.

(2) Negative Electrode

As the negative electrode 33, the electrode according to the 2nd embodiment is used.

(3) Positive Electrode

As the positive electrode 35, the aforementioned positive electrode is used.

(4) Separator

As the separator 34, the aforementioned separator is used.

(5) Nonaqueous Electrolyte

As the nonaqueous electrolyte, the aforementioned nonaqueous electrolyte is used.

Figure 6:
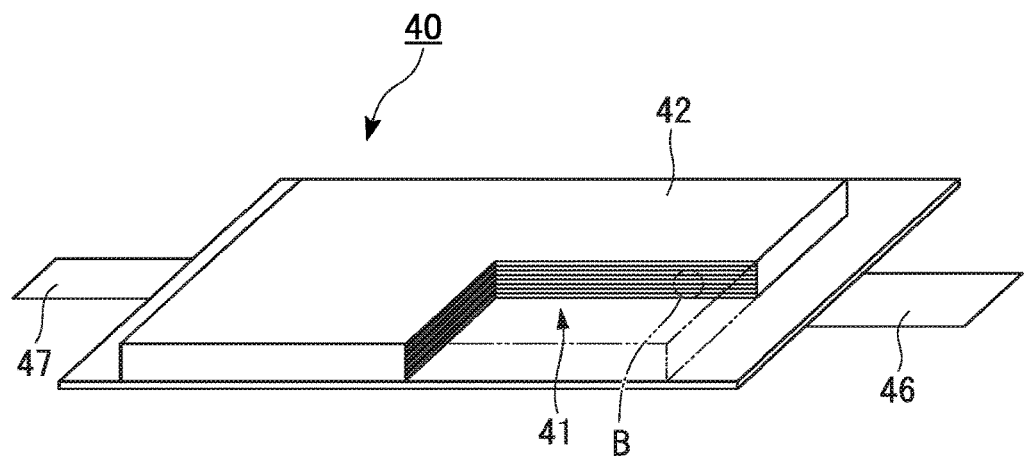
FIG. 6 is a schematic view showing the nonaqueous electrolyte battery according to the 3rd embodiment.
Figure 7:
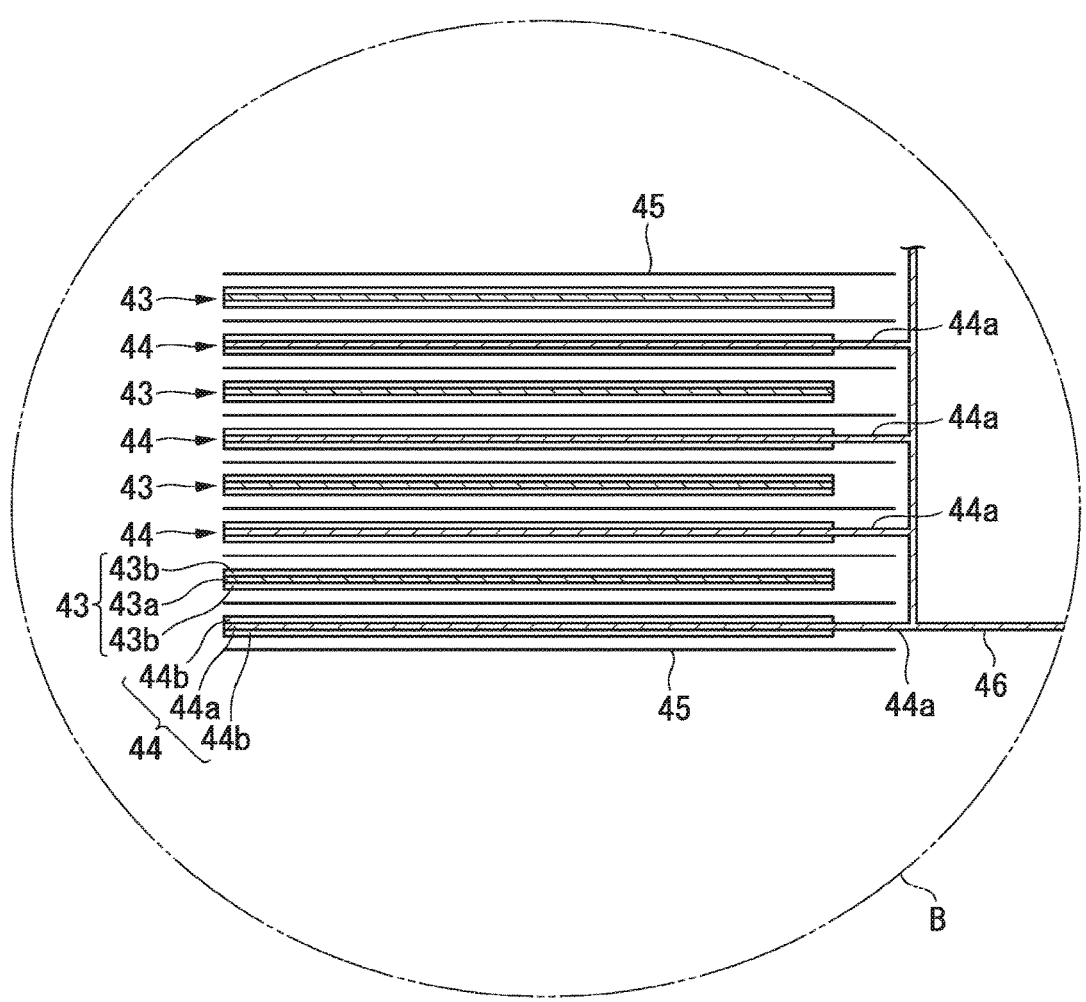
FIG. 7 is a schematic view showing the nonaqueous electrolyte battery according to the 3rd embodiment.

The configuration of the nonaqueous electrolyte battery according to the 3rd embodiment is not limited to the aforementioned configuration shown in FIG. 4 and FIG. 5. For example, it is possible to use the batteries having the configurations shown in FIG. 6 and FIG. 7. FIG. 6 is a partial cutout perspective view schematically showing another flat type nonaqueous electrolyte battery according to the 3rd embodiment. FIG. 7 is an enlarged schematic sectional view showing the part B of FIG. 6.

The nonaqueous electrolyte battery 40 shown in FIG. 6 and FIG. 7 is configured such that the lamination type electrode group 41 is housed in the exterior member 42. As shown in FIG. 7, the lamination type electrode group 41 has the structure in which the positive electrodes 43 and negative electrodes 44 are alternately laminated while interposing separators 45 therebetween.

The plurality of positive electrodes 43 is present and each includes the positive electrode current collector 43a and the positive electrode layers 43b supported on both surfaces of the positive electrode current collector 43a. The positive electrode layer 43b contains the positive electrode active material.

The plurality of negative electrodes 44 is present and each includes the negative electrode current collector 44a and the negative electrode layers 44b supported on both surfaces of the negative electrode current collector 44a. The negative electrode layer 44b contains the electrode material. One side of the negative electrode current collector 44a of each negative electrode 44 protrudes from the negative electrode 44. The protruding negative electrode current collector 44a is electrically connected to a strip-shaped negative electrode terminal 46. The front end of the strip-shaped negative electrode terminal 46 is drawn from the exterior member 42 to the outside. Although not shown in the figure, in the positive electrode current collector 43a of the positive electrode 43, the side located opposite to the protruding side of the negative electrode current collector 44a protrudes from the positive electrode 43. The positive electrode current collector 43a protruding from the positive electrode 43 is electrically connected to the strip-shaped positive electrode terminal 47. The front end of the strip-shaped positive electrode terminal 47 is located on an opposite side to the negative electrode terminal 46, and is drawn from the side of the exterior member 42 to the outside.

The material, a mixture ratio, dimensions, and the like of each member included in the nonaqueous electrolyte battery 40 shown in FIG. 6 and FIG. 7 are configured to be the same as those of each constituent member of the nonaqueous electrolyte battery 30 described in FIG. 4 and FIG. 5.

According to the present embodiment described above, it is possible to provide the nonaqueous electrolyte battery.

The nonaqueous electrolyte battery according to the present embodiment includes the negative electrode, the positive electrode, the nonaqueous electrolyte, the separator and the exterior material. The negative electrode is comprised of the aforementioned electrode for a nonaqueous electrolyte battery according to the 2nd embodiment. For these reasons, the nonaqueous electrolyte battery according to the present embodiment is excellent in energy density and long life.

Fourth Embodiment

Next, the battery pack according to the 4th embodiment is described in detail.

The battery pack according to the present embodiment includes at least one nonaqueous electrolyte battery according to the 3rd embodiment (i.e. a single battery) as a secondary battery. When the plurality of single batteries is included in the battery pack, the respective single batteries are disposed so as to be electrically connected in series, in parallel, or in series and parallel.

Figure 8:
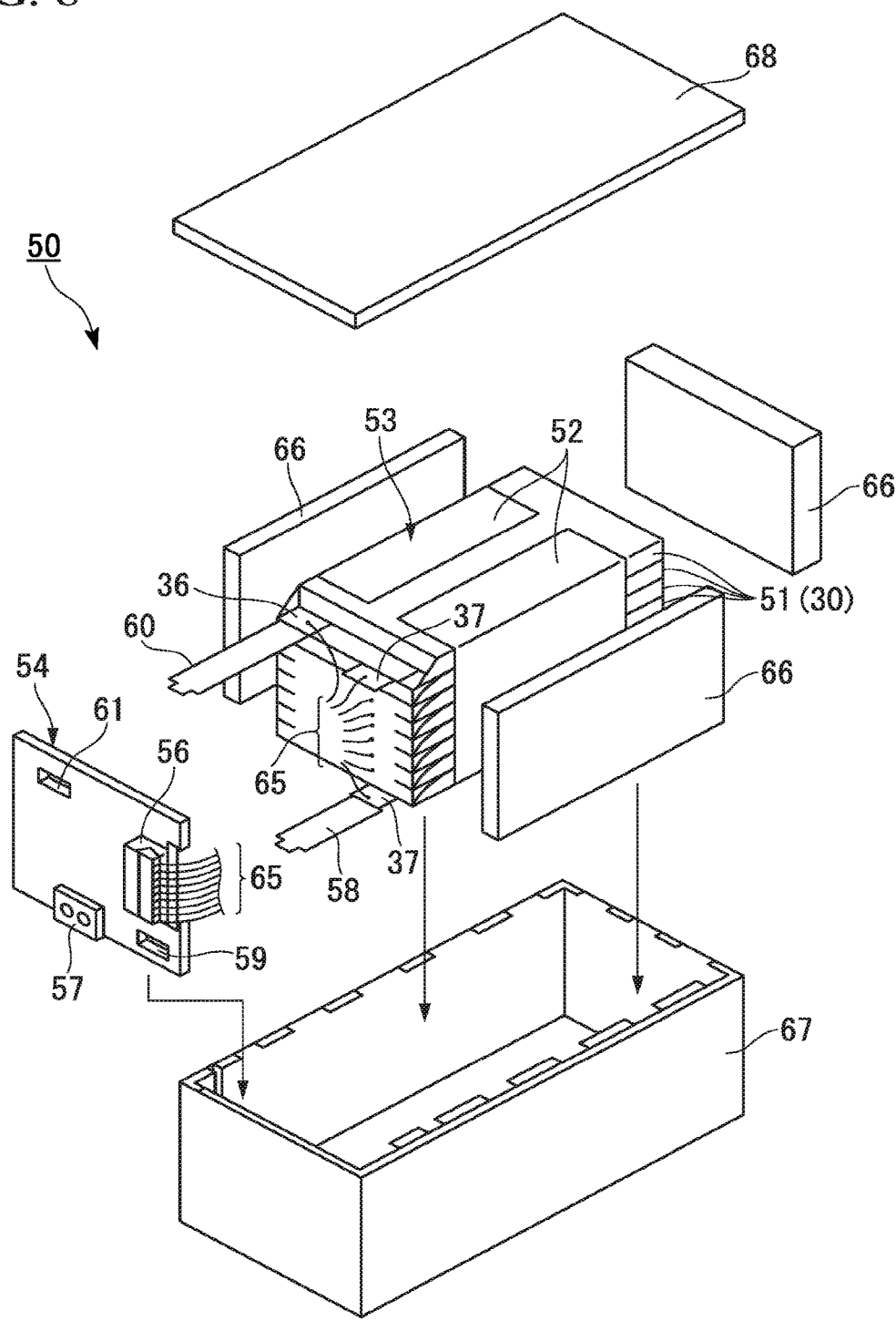
FIG. 8 is a schematic perspective view showing the battery pack according to the 4th embodiment.
Figure 9:
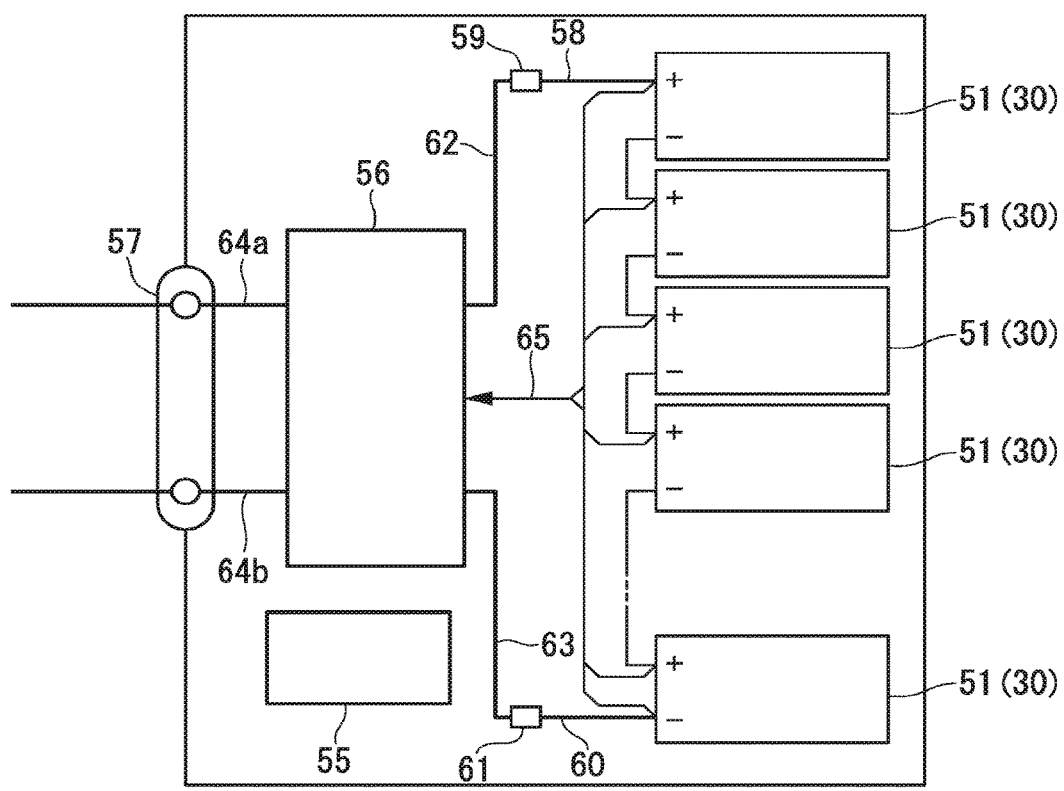
FIG. 9 is a schematic view showing the battery pack according to the 4th embodiment.

Referring to FIG. 8 and FIG. 9, the battery pack 50 according to the present embodiment is described in detail. In the battery pack 50 shown in FIG. 8, the flat type nonaqueous electrolyte battery 30 shown in FIG. 4 is used as the single battery 51. The plurality of single batteries 51 is laminated so that the negative electrode terminals 36 and the positive electrode terminals 37 extending to the outside are arranged in the same direction, and thus the assembled batteries 53 are configured by fastening with the adhesive tape 52. These single batteries 51 are connected mutually and electrically in series, as shown in FIG. 8 and FIG. 9.

The printed wiring board 54 is disposed to face the side surfaces of the single batteries 51 in which the negative electrode terminals 36 and the positive electrode terminals 37 extend. As shown in FIG. 8, the thermistor 55 (see FIG. 9), the protective circuit 56 and the energization terminal 57 for an external device are mounted on the printed wiring board 54. Herein, an insulation plate (not shown in the figure) is mounted on the surface of the printed wiring board 54 facing the assembled batteries 53 in order to avoid unnecessary connection with wirings of the assembled batteries 53.

The positive electrode-side lead 58 is connected to the positive electrode terminal 37 located in the lowermost layer of the assembled batteries 53, and the front end of the positive electrode-side lead is inserted into the positive electrode-side connector 59 of the printed wiring board 54 to be electrically connected. The negative electrode-side lead 60 is connected to the negative electrode terminal 36 located in the uppermost layer of the assembled batteries 53, and the front end of the negative electrode-side lead is inserted into the negative electrode-side connector 61 of the printed wiring board 54 to be electrically connected. These positive electrode-side connector 59 and negative electrode-side connector 61 are connected to the protective circuit 56 via wirings 62 and 63 (see FIG. 9) formed in the printed wiring board 54.

The thermistor 55 is used to detect a temperature of the single battery 51. Although not shown in FIG. 8, the thermistor is installed near the single batteries 51, and a detection signal is transmitted to the protective circuit 56. The protective circuit 56 controls charge and discharge so as to protect the single battery 51. It is possible to block the plus-side wiring 64a and the minus-side wiring 64b between the protective circuit 56 and the external terminal for energizing an external device (the energization terminal) 57 under a predetermined condition. Here, for example, the predetermined condition means that the detection temperature of the thermistor 55 becomes equal to or greater than a predetermined temperature. In addition, the predetermined condition also means that an overcharge, overdischarge, overcurrent, or the like of the single battery 51 be detected. The detection of the overcharge or the like is performed for the respective single batteries 51 or all of the single batteries 51. Herein, when the overcharge or the like is detected in the respective single batteries 51, a battery voltage may be detected, or a positive electrode potential or a negative electrode potential may be detected. In the latter case, a lithium electrode used as a reference electrode is inserted into the respective single batteries 51. In the case of FIG. 8 and FIG. 9, wirings 65 for voltage detection are connected to the respective single batteries 51 and detection signals are transmitted to the protective circuit 56 via the wirings 65. Herein, this protective circuit 56 may be arranged on an external device side.

As shown in FIG. 8, the protective sheets 66 formed of rubber or resin are disposed on three side surfaces of the assembled batteries 53 excluding the side surface from which the positive electrode terminals 37 and the negative electrode terminals 36 protrude.

The assembled batteries 53 are stored together with the respective protective sheets 66 and the printed wiring board 54 in the storing container 67. That is, the protective sheets 66 are disposed on both of the inner surfaces of the storing container 67 in the longer side direction and the inner surface in the shorter side direction, and the printed wiring board 54 is disposed on the inner surface opposite to the protective sheet 66 in the shorter side direction. The assembled batteries 53 are located in a space surrounded by the protective sheets 66 and the printed wiring board 54. The cover 68 is mounted on the upper surface of the storing container 67.

When the assembled batteries 53 are fixed, a thermal shrinkage tape may be used instead of the adhesive tape 52. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, the single batteries 51 connected in series are shown in FIG. 8 and FIG. 9. However, to increase a battery capacity, the single batteries 51 may be connected in parallel or may be connected in a combination form of series connection and parallel connection. The assembled battery packs can also be connected in series or in parallel.

According to the aforementioned present embodiment, it is possible to provide the battery pack. The battery pack according to the present embodiment includes at least one of the aforementioned nonaqueous electrolyte battery according to the 3rd embodiment.

This kind of battery pack is excellent in energy density and long life

Herein, the form of the battery pack can be appropriately modified according to a use application. The use application of the battery pack according to the embodiment is preferably one which is required to show excellent cycle characteristics when a large current is extracted. Specific examples of the use application include a power of digital cameras; and an installation for a vehicle such as a two-wheeled or four-wheeled hybrid electric vehicle, a two-wheeled or four-wheeled electric vehicle, and an assist bicycle. In particular, the battery pack using the nonaqueous electrolyte batteries with excellent high temperature characteristics is appropriately used for an installation for a vehicle.

EXAMPLES

Hereinafter, the aforementioned embodiments are described on the basis of the examples.

Example 1

The negative electrode material was produced under the following conditions.

The commercially available silicon dioxide particle (an average primary particle diameter of 30 nm, amorphous) 0.585 g and the silicon particle (an average primary particle diameter of 20 nm) 0.065 g were added in the solution prepared by dissolving the resol-based phenol resin 1.162 g in ethanol 10 g as the carbon precursor, and the solution was subjected to the crushing and mixing treatment using $ZrO_2$ balls and a planetary ball mill, to thereby prepare the slurry.

The slurry was filtered under reduced pressure to remove the $ZrO_2$ balls, dried at 80° C., and then subjected to the heating and curing treatment at 150° C. for 1 hour, to thereby obtain the mixture of the silicon dioxide particle, the silicon particle and the carbon precursor.

The obtained mixture was added in the alumina crucible and subjected to the thermal treatment using the electric furnace. The thermal treatment was carried out at 1000° C. for 3 hours under an inert atmosphere obtained by introducing an argon gas after vacuum exchange.

Next, the obtained fired product was pulverized in the agate mortar, and subjected to the sieve having an opening of 20 μm, to thereby obtain the negative electrode material of Example 1 in which the silicon dioxide particle and the silicon particle were coated with the carbonaceous material.

The obtained negative electrode material 0.6 g and the graphite powder 0.1 g having an average particle size of 3 μm were added in N-methyl-2-pyrrolidone (NMP) in which polyimide was dissolved at 16 mass %, and the solution was mixed using a mixer, to thereby prepare the pasty slurry.

This slurry was applied onto the copper foil having a thickness of 12 μm, and was rolled and subjected to the thermal treatment at 400° C. for 2 hours in an argon gas atmosphere, to thereby obtain the copper foil with the negative electrode material of Example 1.

Example 2

The negative electrode material and the copper foil with the negative electrode material of Example 2 were produced in the same manner in Example 1 except for using the silicon particle having an average primary particle size of 30 nm.

Example 3

The negative electrode material and the copper foil with the negative electrode material of Example 3 were produced in the same manner in Example 1 except for using the silicon dioxide particle having an average primary particle size of 7 nm and the silicon particle having an average primary particle size of 30 nm.

Example 4

The negative electrode material and the copper foil with the negative electrode material of Example 4 were produced in the same manner in Example 1 except for using the silicon dioxide particle having an average primary particle size of 7 nm and the silicon particle having an average primary particle size of 45 nm.

Example 5

The negative electrode material and the copper foil with the negative electrode material of Example 5 were produced in the same manner in Example 1 except for using the silicon dioxide particle having an average primary particle size of 65 nm and the silicon particle having an average primary particle size of 30 nm.

Comparative Example 1

The negative electrode material and the copper foil with the negative electrode material of Comparative Example 1 were produced in the same manner in Example 1 except for using the silicon dioxide particle having an average primary particle size of 100 nm and the silicon particle having an average primary particle size of 20 nm.

Comparative Example 2

The negative electrode material and the copper foil with the negative electrode material of Comparative Example 2 were produced in the same manner in Example 1 except for using the silicon dioxide particle having an average primary particle size of 7 nm and the silicon particle having an average primary particle size of 80 nm.

Next, the example of forming the silicon carbide phase in the negative electrode material is described.

Example 6

The negative electrode material and the copper foil with the negative electrode material of Example 6 were produced in the same manner in Example 2 except for using the conditions of 1050° C. and 3 hours when carrying out the thermal treatment for the mixture of the silicon dioxide particle, the silicon particle and the carbon precursor during the production of the negative electrode material.

Example 7

The negative electrode material and the copper foil with the negative electrode material of Example 7 were produced in the same manner in Example 2 except for using the conditions of 1100° C. and 3 hours when carrying out the thermal treatment for the mixture of the silicon dioxide particle, the silicon particle and the carbon precursor during the production of the negative electrode material.

Comparative Example 3

The negative electrode material and the copper foil with the negative electrode material of Comparative Example 3 were produced in the same manner in Example 2 except for using the conditions of 1200° C. and 3 hours when carrying out the thermal treatment for the mixture of the silicon dioxide particle, the silicon particle and the carbon precursor during the production of the negative electrode material.

Next, the samples, in which the content of the silicon dioxide particle and the silicon particle in the negative electrode material was set constantly to about 55 mass %, and the content of the silicon particle in the negative electrode material was varied, were produced.

Example 8

The negative electrode material and the copper foil with the negative electrode material of Example 8 were produced in the same manner in Example 2 except that the silicon dioxide particle 0.618 g and the silicon particle 0.033 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 2.8 mass %.

Example 9

The negative electrode material and the copper foil with the negative electrode material of Example 9 were produced in the same manner in Example 2 except that the silicon dioxide particle 0.455 g and the silicon particle 0.195 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 16.6 mass %.

Comparative Example 4

The negative electrode material and the copper foil with the negative electrode material of Comparative Example 4 were produced in the same manner in Example 2 except that the silicon dioxide particle 0.39 g and the silicon particle 0.26 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 22.1 mass %.

Next, the samples, in which the content of the silicon dioxide particle and the silicon particle in the negative electrode material was set constantly to about 71 mass %, and the content of the silicon particle in the negative electrode material was varied, were produced.

Example 10

The negative electrode material and the copper foil with the negative electrode material of Example 10 were produced in the same manner in Example 2 except that the silicon dioxide particle 0.95 g and the silicon particle 0.05 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 3.6 mass %.

Example 11

The negative electrode material and the copper foil with the negative electrode material of Example 11 were produced in the same manner in Example 2 except that the silicon dioxide particle 0.80 g and the silicon particle 0.20 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 14.2 mass %.

Comparative Example 5

The negative electrode material and the copper foil with the negative electrode material of Comparative Example 5 were produced in the same manner in Example 2 except that the silicon dioxide particle 0.70 g and the silicon particle 0.30 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

The content of the silicon particle in the negative electrode material was 21.3 mass %.

Comparative Example 6

The negative electrode material and the copper foil with the negative electrode material of Comparative Example 6 were produced in the same manner in Example 2 except that the silicon monoxide particle 0.585 g having a average primary particle size of about 200 nm and the silicon particle 0.065 g were added in the solution prepared by dissolving the resol-based phenol resin 1.162 g in ethanol 10 g as the carbon precursor, and that the solution was subjected to the crushing and mixing treatment using $ZrO_2$ balls and a planetary ball mill, to thereby prepare the slurry.

[Evaluation of Electrochemical Characteristics]

(Preparation of Nonaqueous Electrolyte Solution)

Ethylene carbonate (EC) and diethyl carbonate (DEC) were respectively mixed at a volume ratio of 1:2, to thereby prepare the mixed solvent. In this mixed solvent, $LiPF_6$ was dissolved, to thereby prepare the nonaqueous electrolyte solution.

(Production of Nonaqueous Electrolyte Battery)

The copper foil with the negative electrode material was cut in the size of 20 mm×20 mm, and then, was dried under vacuum at 100° C. for 12 hours, to thereby obtain the test electrode.

The aforementioned test electrode, the Li metal as a counter electrode and a reference electrode, and the nonaqueous electrolytic solution were housed in the bottomed container, to produce the nonaqueous electrolyte battery half cell.

The assembly of the battery was carried out in the glove box filled with an argon atmosphere.

(Charge and Discharge Test)

Regarding the conditions for the charge and discharge test, the charge was carried out at a constant current density of 0.5 mA/cm$^2$ (cut off 0.0075 mA/cm$^2$) until the electrical potential difference between the reference electrode and the test electrode became 0.01 V, and moreover, the constant voltage charge was carried out at 0.01 V. The termination condition was set as 0.025 mA/cm$^2$ or 150 hours. The discharge was carried out at a constant current density of 0.25 mA/cm$^2$ to reach 1.5 V. The ratio of the discharge capacity to the charge capacity at this time was defined as the first-time charge and discharge efficiency.

Thereafter, the charge was carried out at a current density of 1.5 mA/cm$^2$ until the electrical potential difference between the reference electrode and the test electrode became 0.01 V, and then the discharge was carried out at the current density of 1.5 mA/cm$^2$ to reach 1.5 V. This cycle was repeated 100 times. The ratio of the discharge capacity at the 50th cycle to the discharge capacity at the 1st cycle of the charge and discharge at a current density of 1.5 mA/cm$^2$ was defined as the discharge capacity holding ratio.

The results of Examples 1 to 11 and Comparative Examples 1 to 6 are summarized in Tables 1 to 4. The ratios D2/D1 of the average primary particle size D2 of the silicon particle to the average primary particle size D1 of the silicon dioxide particle were also described in the Tables.

TABLE 1

|  | Size D1 of Silicon Dioxide Particle (nm) | Size D2 of Silicon Particle (nm) | D2/D1 | First-Time Discharge Capacity (mAh/g) | Holding Ratio after 50th cycle (%) | First-Time Charge Time (h) |
|---|---|---|---|---|---|---|
| Example 1 | 30 | 20 | 0.7 | 896 | 94.4 | 38.8 |
| Example 2 | 30 | 30 | 1 | 910 | 92.5 | 41.1 |
| Example 3 | 7 | 30 | 4.3 | 776 | 93.8 | 60.1 |
| Example 4 | 7 | 45 | 6.4 | 820 | 92.1 | 65.7 |
| Example 5 | 65 | 30 | 0.5 | 835 | 92.2 | 80.3 |
| Comparative Example 1 | 100 | 20 | 0.2 | 792 | 92.8 | >150 |
| Comparative Example 2 | 7 | 80 | 11.4 | 801 | 85.3 | 87 |

TABLE 2

|  | Firing Temperature (° C.) | First-Time Discharge Capacity (mAh/g) | First-Time Efficiency (%) | Holding Ratio after 50th Cycle (%) |
|---|---|---|---|---|
| Example 6 | 1050 | 828 | 56.3 | 92.5 |
| Example 7 | 1100 | 772 | 56.2 | 92.6 |
| Comparative Example 3 | 1200 | 675 | 56.3 | 92.8 |

TABLE 3

|  | (Silicon + Silicon Oxide)/Composite Particle (wt %) | Silicon Particle (wt %) | First-Time Discharge Capacity (mAh/g) | Holding Ratio after 50th Cycle (%) |
|---|---|---|---|---|
| Example 8 | 55 | 2.8 | 780 | 92.7 |
| Example 9 | 55 | 16.6 | 980 | 90.8 |
| Comparative Example 4 | 55 | 22.1 | 1135 | 84.8 |
| Example 10 | 71 | 3.6 | 814 | 92.7 |
| Example 11 | 71 | 14.2 | 920 | 90.1 |
| Comparative Example 5 | 71 | 21.3 | 992 | 84.2 |

TABLE 4

|  | Size D1 of Silicon Dioxide Particle (nm) | Size D2 of Silicon Particle (nm) | D2/D1 | First-Time Discharge Capacity (mAh/g) | Holding Ratio after 50th Cycle (%) | First-Time Charge Time (h) |
|---|---|---|---|---|---|---|
| Comparative Example 6 | 200 | 80 | 0.4 | 1025 | 83.2 | 64.1 |

As can be seen from the results of Table 1, Examples 1 to 5 and Comparative Examples 1 to 2 shows the different results depending on the average primary particle size D1 of the silicon dioxide particle used as the raw material, the average primary particle size D2 of the silicon particle used as the raw material, and the ratio D2/D1 of D2 to D1. Herein, the silicon dioxide particle and the silicon particle have the difference in crystallinity, and therefore, can be easily distinguished by observing with a transmission electron microscope (TEM). The particle showing a crystal structure is the silicon particle. Through this process, it is possible to measure the average primary particle sizes of the respective particles by using the aforementioned method.

Also, the content of the silicon particle can be obtained by subjecting the electrode surface to the X-ray photoelectron spectroscopy (Electron Spectroscopy for Chemical Analysis: ESCA) and quantifying the abundance ratio $Si^0$ by the waveform separation analysis of the peaks obtained from the photoelectron spectrum of $Si_{2p}$. In addition, the content of the silicon particle can be estimated by the quantitative analysis of the elements Si, O and C of the electrode composition.

As shown in Table 1, it was found that, when the average primary particle diameter of the silicon particle increased, the effect of the volume expansion increased, and the cycle characteristics were deteriorated. In particular, as shown in Comparative Example 2, when the average primary particle diameter of the silicon particle became 80 nm, the effect of deteriorating the cycle characteristics increased.

Regarding the silicon dioxide particle, when the average primary particle diameter of the silicon particle increased, the time required for the first-time charge increased. In particular, as shown in Comparative Example 1, the silicon dioxide particle having an average primary particle diameter of more than 100 nm showed the charge time of more than 150 hours although the time of 150 hours was set as the termination condition of the charge in the experiment. Such a long charge time is not preferable because the precipitation of lithium easily causes the formation of a dendrite. The average primary particle diameter of the silicon dioxide particle is set to smaller than 80 nm.

Also, when using the silicon dioxide particle having the average primary particle diameter of 7 nm, the first-time charge time became longer than that of the silicon dioxide particle having the average primary particle diameter of 30 nm. This can be considered because the fine silicon dioxide particles formed the secondary particles during the production of the electrode material in this experiment, and the secondary particles existed as the aggregate in the electrode. Although it depends on the level of aggregation, this type of aggregate causes no particular problem.

The results shown in Table 2 are the results of having examined the effect of the temperature of the thermal treatment on the carbon precursor during the production of the negative electrode material. It was found that the first-time discharge capacity decreased as the temperature of the thermal treatment increased. This can be considered because the silicon carbide phase was formed accompanying with the increase in the temperature of the thermal treatment, and the added silicon particle was used for the formation of the silicon carbide phase. Actually, the results of the X-ray diffraction measurement confirmed the peak in the vicinity of $2\theta=35.6°$, which indicated the presence of the silicon carbide phase, and it was observed that the value of this peak increased as the temperature of the thermal treatment increased. When the temperature of the thermal treatment was raised to 1200° C., most of the added silicon particles were changed into the silicon carbides, and thus, the addition of the silicon particle became meaningless. Thus, this temperature is not preferable. Accordingly, it is preferable that the temperature of the thermal treatment be lower than 1200° C.

Table 3 shows the effect of the addition amount of the silicon particle. From the results of Table 3, it was found that the addition amount of the silicon particle had little effect on the cycle characteristics of the negative electrode up to 20 mass %. When the addition amount of the silicon particle was more than 20 wt %, it was found that the addition amount of the silicon particle exerted an effect on the cycle characteristics of the negative electrode. In other words, as long as the addition amount of the silicon particle is up to 20 mass %, it is possible to improve the first-time discharge capacity without deteriorating the cycle characteristics.

Table 4 shows the results when using the composite particle containing the silicon monoxide particle and the silicon particle for the negative electrode material. The silicon monoxide particle caused a disproportionation reaction to separate itself into the silicon dioxide particle and the silicon particle through the thermal treatment. The silicon particles generated from this disproportionation reaction is as small as several nanometers, but is likely to cause grain growth. For this reason, it was found that when using the silicon monoxide particle, the decrease in the discharge capacity during cycles was sharper than when using the silicon dioxide particle.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode material for a nonaqueous electrolyte battery comprising:
   a composite particle, wherein the composite particle comprises a silicon dioxide particle having an average primary particle size of D1, a silicon particle having an average primary particle size of D2, and a carbon material,
   wherein the D1 is 5 nm or more and 80 nm or less,
   wherein a ratio D2/D1 is 0.3 or more and 8 or less,
   wherein the silicon dioxide particles and the silicon particles are coated with the carbon material, and
   wherein the whole of the surface of the silicon dioxide particle and the silicon particle is coated with the carbon material, or a part thereof is exposed on the surface of the electrode material, wherein the silicon dioxide and the silicon particle exist independently.

2. The electrode material according to claim 1, wherein a content of the silicon particle in the composite particle is 1 mass % or more and 20 mass % or less.

3. The electrode material according to claim 1, wherein the silicon dioxide particle is a particle mainly having an amorphous phase, and the silicon particle is a particle partially having a crystalline phase.

4. The electrode material according to claim 1, wherein the composite particle has a silicon carbide phase.

5. An electrode for a nonaqueous electrolyte battery comprising:
   a current collector; and
   an electrode mixture layer that is formed on the current collector and contains the electrode material according to claim 1, an electroconductive material and a binder.

6. A nonaqueous electrolyte battery comprising:
   a positive electrode containing a positive electrode active material;
   the negative electrode formed of the electrode according to claim 5; and
   a nonaqueous electrolyte.

7. A battery pack comprising the nonaqueous electrolyte battery according to claim 6.

8. The battery pack according to claim 7 further comprising:
   a protective circuit; and
   an external terminal for energization.

9. The battery pack according to claim 7, wherein the nonaqueous electrolyte batteries are connected in series, in parallel or with a combination of series connection and parallel connection.

* * * * *